SIGNALING APPARATUS FOR RADIO TELEPHONE SYSTEMS

Filed May 28, 1949 5 Sheets-Sheet 1

FIG. I

INVENTOR.
ROBERT P. DIMMER
BY
Chas. Le. Candy
ATTORNEY

SIGNALING APPARATUS FOR RADIO TELEPHONE SYSTEMS

Filed May 28, 1949 5 Sheets-Sheet 2

RADIO CONTROL STATION

INVENTOR.
ROBERT P. DIMMER
BY
[signature]
ATTORNEY

April 10, 1951 R. P. DIMMER 2,548,777

SIGNALING APPARATUS FOR RADIO TELEPHONE SYSTEMS

Filed May 28, 1949 5 Sheets-Sheet 3

INVENTOR.
ROBERT P. DIMMER

BY

Chas. L. Cordy

ATTORNEY

April 10, 1951 R. P. DIMMER 2,548,777

SIGNALING APPARATUS FOR RADIO TELEPHONE SYSTEMS

Filed May 28, 1949 5 Sheets-Sheet 4

INVENTOR.
ROBERT P. DIMMER

BY Chas. W. Candy

ATTORNEY

INVENTOR.
ROBERT P. DIMMER
BY [signature]
ATTORNEY

Patented Apr. 10, 1951 2,548,777

UNITED STATES PATENT OFFICE 2,548,777

SIGNALING APPARATUS FOR RADIO TELEPHONE SYSTEMS

Robert P. Dimmer, Chicago, Ill., assignor to Automatic Electric Laboratories, Inc., Chicago, Ill., a corporation of Delaware Application May 28, 1949, Serial No. 95,903

8 Claims. (Cl. 250—6)

This invention relates in general to a mobile radio telephone system and more particularly to an improved apparatus for sending frequency code pulses over a wireless transmitter to operate an elerting signal in one of a plurality of mobile stations having receivers tuned to the transmitter.

It is an object of the invention to provide compact, efficient, and economical apparatus for controlling the transmission of frequency code signals.

Another object of the invention is to provide a simplified device which will control the transmission of frequency code signals initiated by a conventional telephone dial.

A further object of the invention is to provide a new and novel circuit for transmitting frequency code signals to two alternate frequencies which may be translated to actuate an alerting signal on one of a plurality of receivers tuned to the same circuit.

Other objects will become apparent from the following specification together with the accompanying drawings which show a proposed embodiment by way of example.

In the accompanying drawings Figures 1, 2, and 3, when placed side-by-side, show a control circuit partially in block form.

Referring to Figures 1, 2, 3, and 5, a description of the equipment will be given.

*Telephone office equipment*

Figure 5:
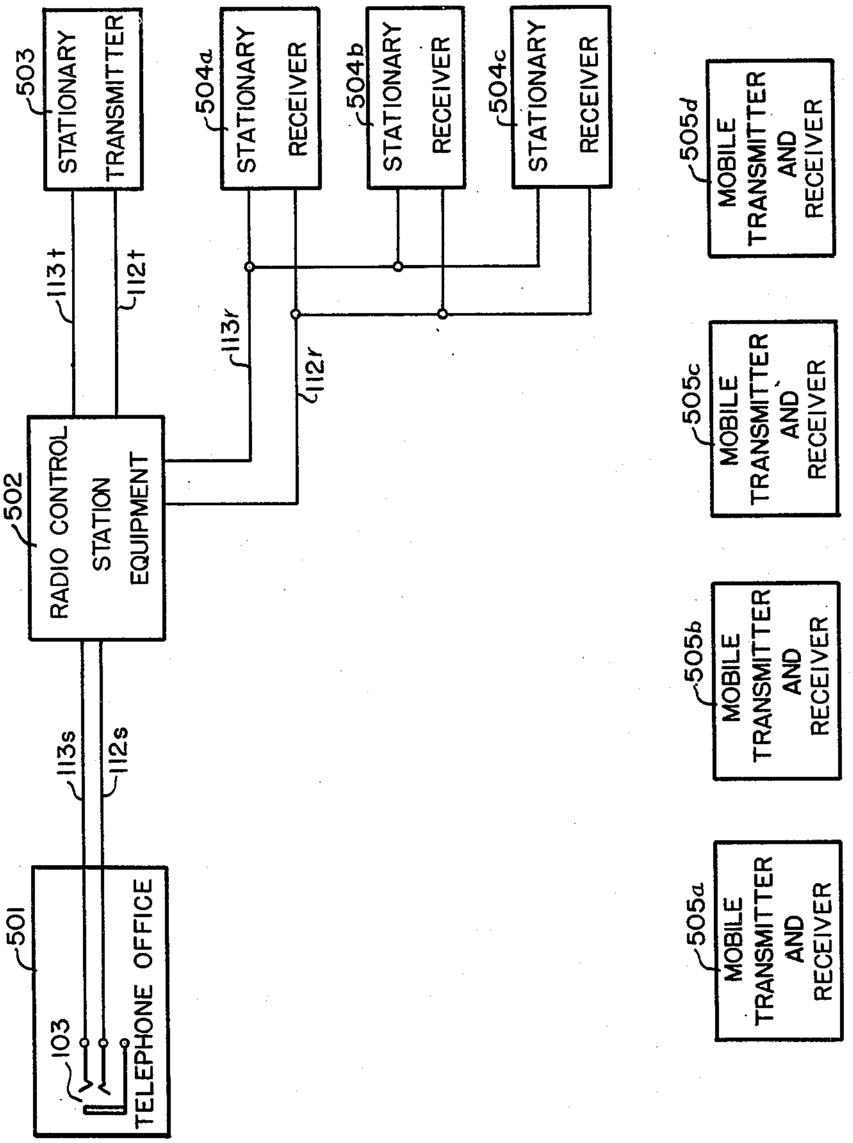
Figure 5 shows in block form the system of which this application forms a part.

Reference character 501 of Fig. 5 indicates a telephone office which is connected by a physical circuit of two wires to a radio control station 502. The telephone office may be of any well known system comprising a switch board staffed by one or more operators and subscriber telephone stations being connected to the switchboard by any well known means, and it is, therefore, considered satisfactory for the purpose of this specification to indicate the telephone office equipment in block form.

The operator equipment comprises conventional toll position equipment including a dial (not shown) for dialing the directory call numbers of the mobile stations tuned to the radio control station. It is, therefore, considered satisfactory to represent the operator equipment by a multiplied jack identified by the reference character 103. The telephone office 501 of Fig. 5 is shown in greater detail, with signal lights included, in Fig. 1.

*Radio control station*

Reference character 502 in Fig. 5 indicates a radio control terminal connected to several radio receivers, 504*a*, 504*b*, and 504*c*, and a radio transmitter 503. The control terminal 502 is shown in detail in Figures 1, 2, 3 and 4. The transmitter 503 may be of the conventional type and the receivers 504*a*, 504*b*, and 504*c* may likewise be conventional in design. A number of stationary receivers may be located uniformly throughout a particular area in order to pick up weak signals from a mobile unit which might be out of range if a single receiver only were to be used. All of the receivers may be connected to a common circuit as shown in Fig. 5 in which three receivers are connected to conductors 112*r* and 113*r*.

A preferred type of mobile receiver was described in my application Serial No. 57,442, filed October 30, 1948. The alerting or ringing device of that application may be employed in the mobile units 505*a*, 505*b*, 505*c*, and 505*d*. The transmitters used in the mobile units are of any conventional low-power type. The mobile transmitters are on a different channel from the stationary transmitter.

Figure 1:
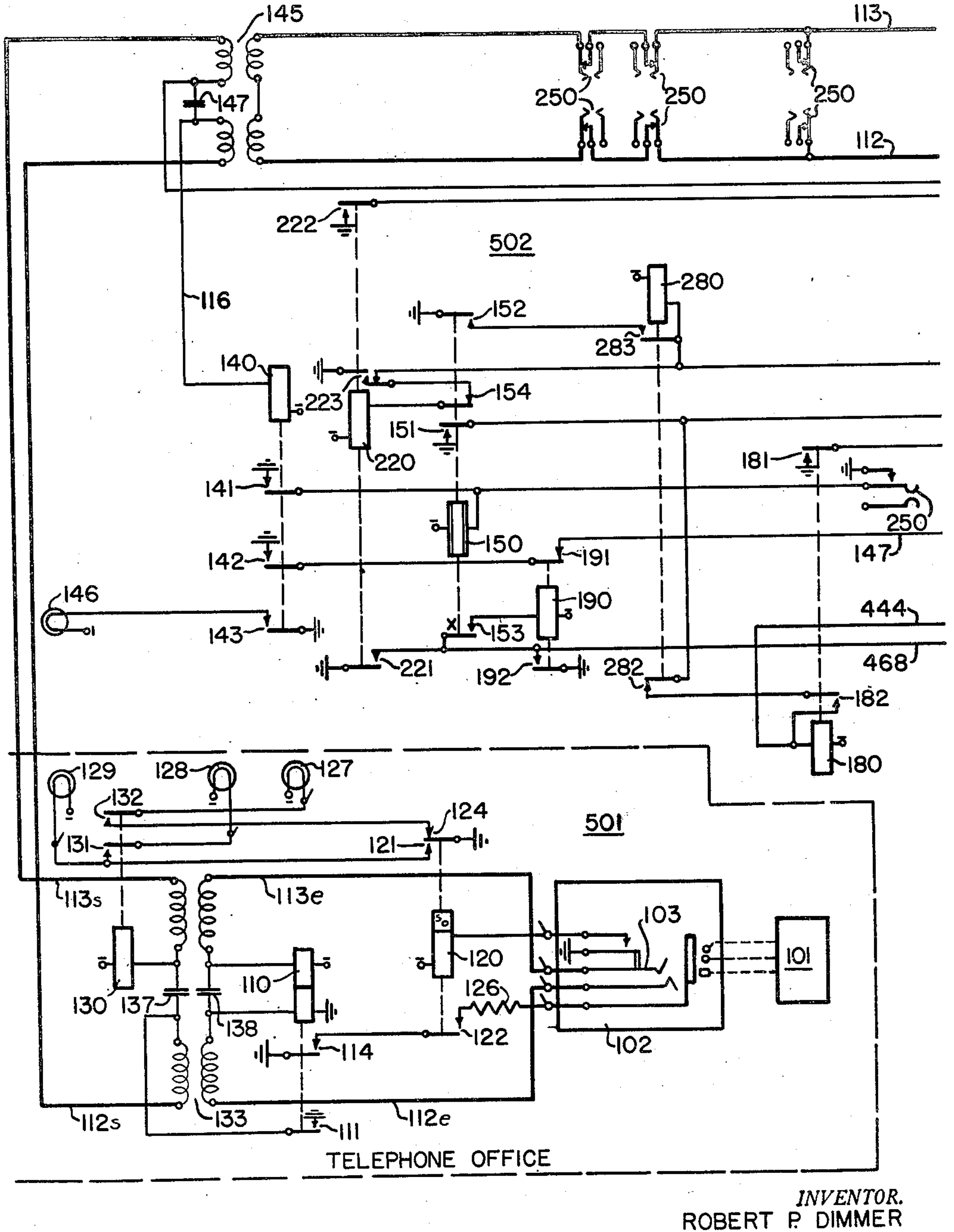
Figure 2:
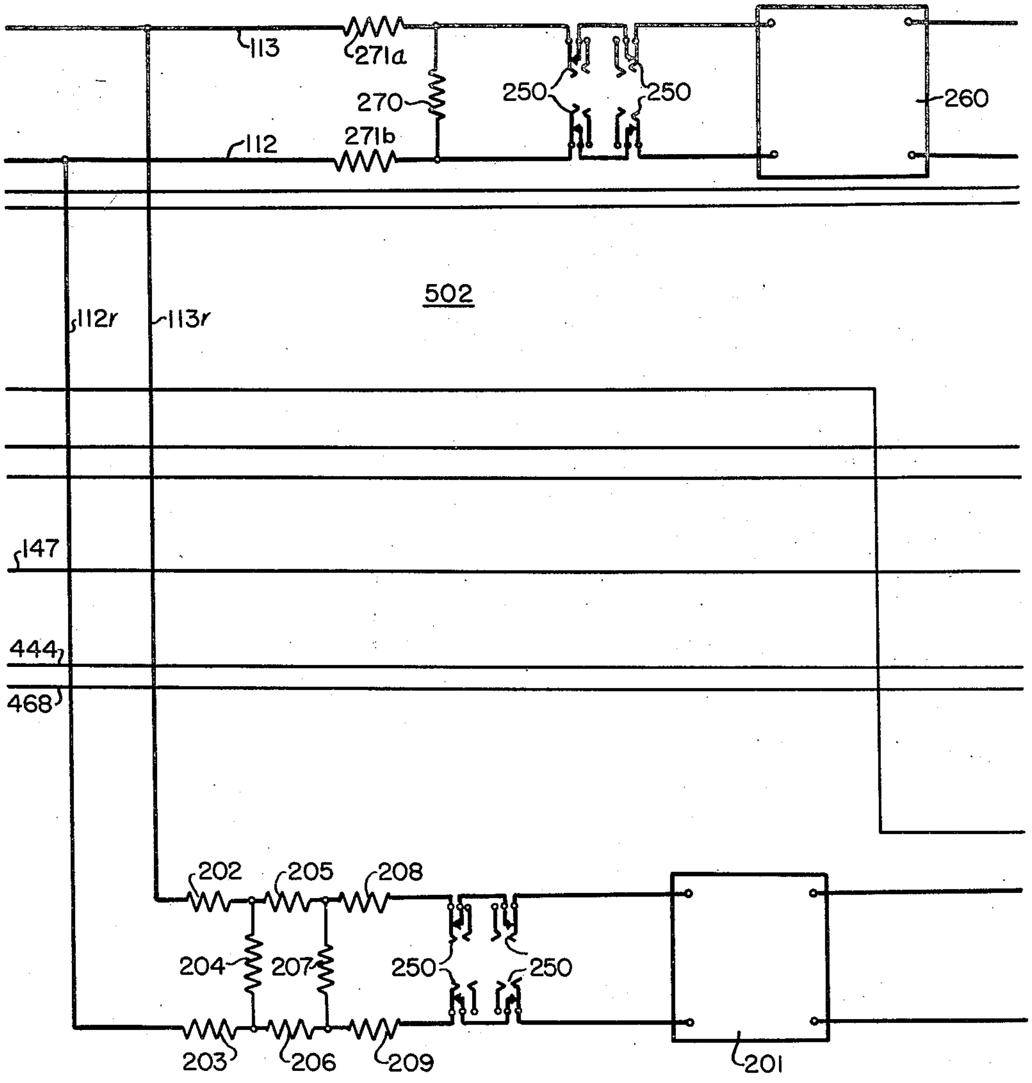
Figure 3:
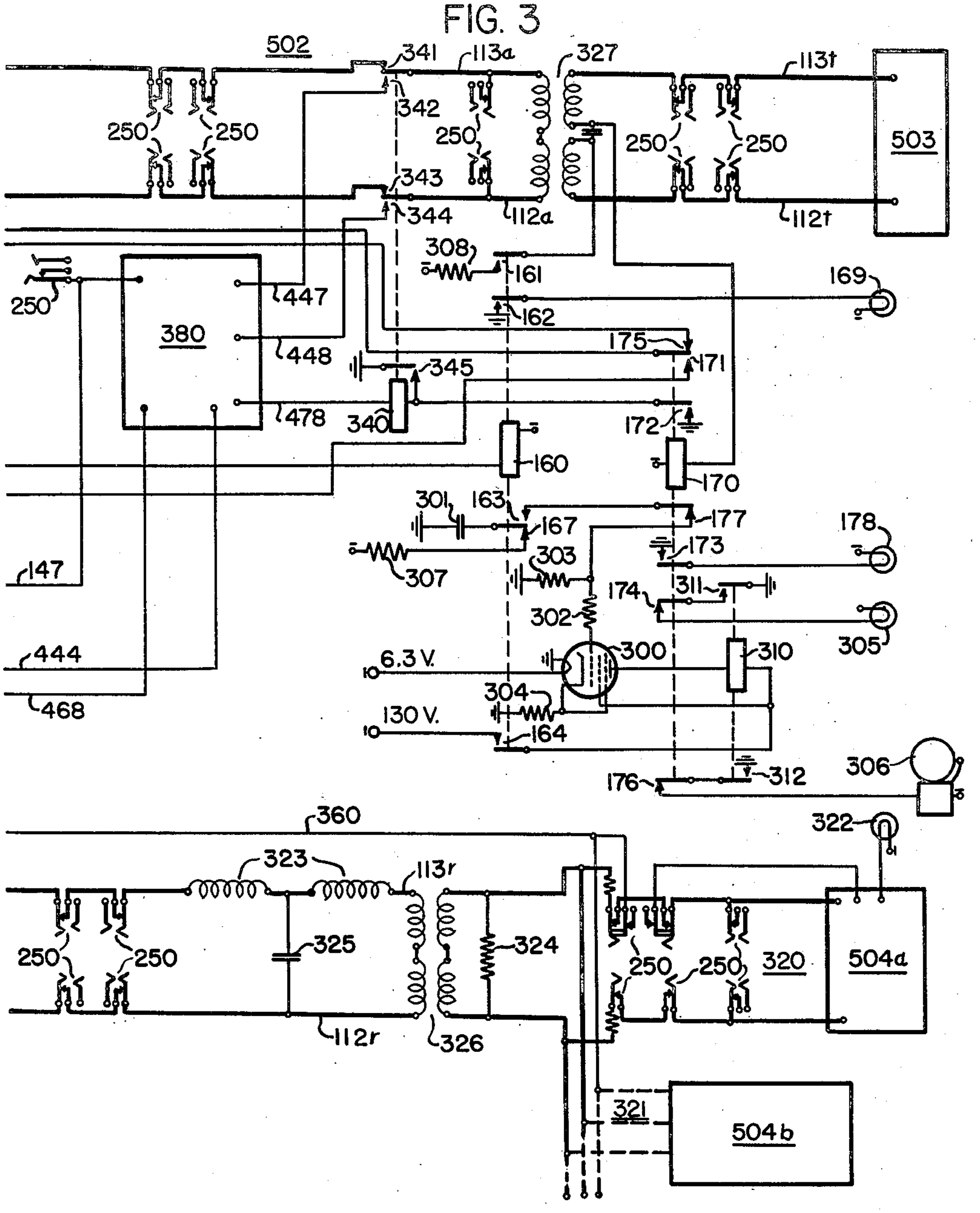

In Figures 1, 2, and 3, numeral 501 designates the switchboard which may have the switchboard jacks associated with the conventional manual exchange. A voice current sent through the switchboard passes through the repeating coils 133, 145, and 327 to the transmitter 503. The voice current also passes through an attenuator pad represented by the resistors 270, 271*a*, and 271*b* and a constant level amplifier 260 during passage to the transmitter 503.

A return call is picked up by the receivers 504*a* and 504*b*, passed through the repeating coil 326, the low-pass filter represented by the inductors 323 and capacitor 325, the amplifier 201 and the attenuator pad represented by the resistors 202 to 209.

A number of test jacks 250 appear throughout the transmitting and receiving circuits. These are located in the control room and may be used to cut the various parts into or out of the circuit. Also located in the control room is an alarm circuit controlled by relays 160 and 170 which operate an alarm 306 in the event the transmitter 503 fails.

Figure 4:
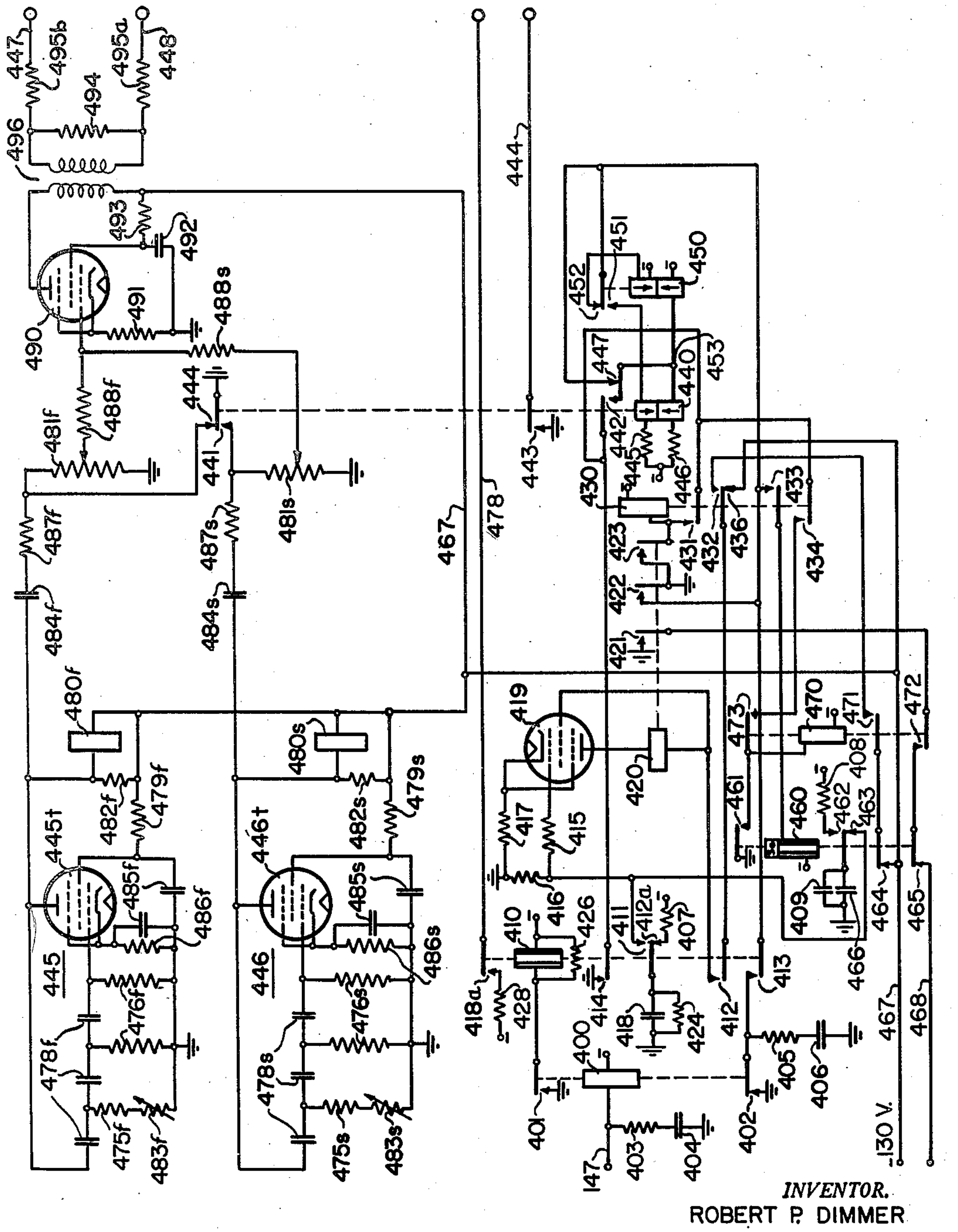
Figure 4 shows an oscillator control circuit.

Most of the relays shown in Fig. 1 and Fig. 3 serve to control the pulse-sending oscillator circuit shown in block form in Fig. 3 and depicted more fully in Fig. 4. The function of these relays will be explained in detail hereinafter.

When a mobile subscriber picks up his telephone instrument in answer to a call his transmitting circuit is prepared automatically by the closing of a switch-hook circuit. However, his transmitter and receiver cannot be operated simultaneously and he must manipulate a push-button in order to complete the transmitter circuit. When he does so the stationary receivers 504a, 504b, or 504c, carry his speech to the operator at telephone office 501.

A detailed explanation of the operation of the radio control station equipment will now be given with reference to Figures 1, 2 and 3.

The telephone switchboard apparatus includes the jack 103, the relays 110, 120, and 130 and the signal lamps 127, 128, and 129. Other signal lamps and relays shown in Figures 1, 2, and 3 are part of the radio control station equipment. The switchboard may be physically separated from the control station equipment. It is obvious that both the switchboard and control equipment could occupy locations in the same quarters or could be separated if desired.

When a land subscriber, as illustrated at 101, wishes to call a mobile subscriber, he first contacts the mobile service operator at the switchboard 102 in the usual manner. The operator inserts the outgoing cord circuit plug into a mobile service jack 103. Insertion of the plug closes a circuit between the tip and ring springs of the jack 103 and energizes a relay 110. Operation of the relay 110 at its contacts 111 places ground on a control conductor 112s which, together with a conductor 113s, serves as the trunk circuit between the switchboard and the control station. At contacts 114 relay 110 prepares a circuit for grounding the sleeve of jack 103 to mark multiples of jack 103 busy to other operators. Insertion of the plug also energizes a relay 120 of the trunk circuit which completes a circuit through its contacts 121 for the operation of a red busy lamp 129 and at contacts 122 completes the circuit for grounding the sleeve of jack 103.

When the contacts 111 close ground is furnished over conductor 112s for operation of a control relay 140. The energization of relay 140 places a slow-release relay 150 in operation through the contacts 141. At contacts 142 relay 140 connects ground over contacts 191 and conductor 147 for operating relay 400 (Fig. 4), and at contacts 143 lights the line lamp on the control panel. The energization of the relay 150 operates a relay 160 through the contacts 151, and at contacts 153 prepares the circuit for relay 190. At its contacts 161 relay 160 supplies battery over the conductor 112t to place a radio transmitter 503 on the air. A control terminal busy lamp 169 is also operated by the relay 160 through its contacts 162, at contacts 164 relay 160 connects a 130 volt source through relay 310 to the plate of tube 300, and at contacts 163 connects the negative pole of charged condenser 301 to the grid of tube 300 for a purpose to be described more fully hereinafter.

When the transmitter 503 goes on the air and is on the correct frequency a return ground is sent from it to operate a relay 170. The operation of relay 170 places a ground through its contacts 173 to operate a green on-air indicator light 178 on the control panel. Relay 170 at contacts 171 prepares an operating circuit for relay 130, at contacts 172 prepares the circuit for relay 340, at contacts 177 disconnects the charged condenser 301 from the grid of the tube 300, at contacts 174 opens the circuit to lamp 305 and at contacts 176 opens the circuit to the alarm 306.

At the time the transmitter 503 first went on the air the oscillator circuit relay 400 was energized as a result of relay 140 operating and closing contacts 142. The operation of the relay 400 energized a slow-release relay 410 through the contacts 401. At contacts 418a relay 410 completed a circuit for operating relay 340 as follows: from negative battery and associated resistance R, contacts 418a, conductor 478, winding of relay 340 to ground at contacts 172. At contacts 414 relay 410 grounds a locking conductor for subsequently locking relays 430, 440 and 470, at contacts 412 connects the 130 volt source to plate relay 420, at contacts 413 prepares the pulsing circuit to relays 440 and 450. Relay 340 at contacts 345 locks independent of ground at contacts 172 and at contacts 342 and 344 connects the oscillator 446 of Fig. 4 to the transmitter 503.

Operation of the relay 410 also prepared timing circuits for an electron tube 419 by placing a charged condenser 418 in the circuit of the tube 419 through the contacts 411. The polarity of the condenser was negative to the grid of tube 419 and therefore plate current in the tube did not flow until all of the charge on condenser 418 had been dissipated through a pair of resistors 416 and 424. The resistors 416 and 424 are of such a value as to permit a delay of two seconds before sufficient plate current flows in tube 419 to operate a relay 420 by way of contacts 412 and 436 to the 130 volt source.

Relay 420, therefore, operates after a delay of approximately two seconds and at contacts 423 completes a circuit for operating relay 430 which at contacts 431 locks itself operated to ground at contacts 414. The relay 430 at contacts 436 opens the operating circuit of relay 420 which restores. Although a momentary circuit for slow-to-operate relay 460 was completed by way of contacts 422 and 433 the time duration was insufficient to cause the operation of the slow-to-operate relay 460. During the short time interval relay 420 was operated a momentary pulse is sent to operate relay 440 as follows: from ground by way of contacts 422, contacts 447 and through the lower winding of differential relay 400 and resistance 446 to battery. This ground pulse may also be traced through both windings of relay 450 and since both relays 450 and 440 are differential relays only relay 440 operates because only its lower winding is energized. Relay 440 closes contacts 442 before opening contacts 447 to lock itself energized to ground at contacts 414 and to maintain ground connected through the lower winding of relay 450. Now when relay 420 restores and ground at contacts 422 is removed from contacts 452 the circuit through the upper winding of relay 450 is opened with the result that relay 450 now operates through energization of its lower winding from ground at contacts 414. At contacts 451 relay 450 prepares a circuit for forcibly restoring relay 440 in response to a succeeding dial pulse.

Relay 440, upon operating, completes a circuit for operating relay 180 as follows: ground, contacts 443, conductor 444 and winding of relay 180 to battery. Relay 180 locks by way of contacts 182, 282, and grounded contacts 151 and at contacts 181 completes a circuit for energizing relay 130 as follows: ground, contacts 181, 171, upper left-hand winding of repeat coil 145, over the conductors connecting the control station to the telephone exchange, upper left-hand winding of repeat coil 133 and winding of relay 130 to battery. Relay 130 closes contacts 131 to operate lamp 128 from grounded contacts 121 thereby informing the operator at the switchboard that she may now dial the called mobile subscriber's number.

During the two second delay for operating relays 420 and 440 as previously described, 600 cycle was being transmitted from oscillator 446 and amplified by amplifier 490 and transmitted through repeat coil 496 by way of conductors 447 and 448, contacts 342 and 344 and repeat coil 327 to the transmitter 503 for modulating the transmitted carrier. Now when relay 440 operates and closes contacts 441 and opens contacts 444 the transmission 600 cycle from oscillator 446 is effectively cut off and the transmission of 1500 cycle from oscillator 445 is effectively connected for transmission to the transmitter over the previously traced circuit. This 1500 cycle modulates the carrier transmitted by transmitter 503 until the operator starts to dial.

From the foregoing description it will be seen that in response to the operator seizing the control station the carrier is placed on the air and is modulated by 600 cycles for a period of two seconds after which the carrier is modulated by 1500 cycles until the operator starts dialling.

When the operator dials the called subscriber's number relay 110 follows the pulses and on each pulse drops back to open the circuit to relay 140. Relay 140 accordingly drops back for each pulse and opens the circuit to relay 400 which also drops back for each pulse transmitted. Relay 150, due to its slow-to-release characteristics remains operated during pulsing. Relay 410 is also a slow-to-release relay and likewise remains operated during pulsing.

In response to the first pulse of the first digit dialled relay 400 momentarily restores and at contacts 402 closes a circuit for forcibly releasing differential relay 440 as follows: ground, contacts 402, 413, 451, upper winding of relay 440, resistance 445 to battery. Since the lower winding of relay 440 is, at this time, also energized from ground at contacts 414 over contacts 442, the two energized windings of this differential relay opposes each other with the result that differential relay 440 is forcibly released. Relay 440, upon restoring, closes contacts 447 before opening contacts 442 thereby maintaining the lower winding of relay 450 alone energized from ground at contacts 402. At contacts 444 relay 440 effectively cuts off the 1500 cycle oscillator 445 and renders the 600 cycle oscillator 446 effective to modulate the carrier frequency being transmitted from transmitter 503. When the pulse is terminated relay 400 reoperates and removes ground at contacts 402 from both windings of relay 440 and from the lower winding of relay 450 whereupon relay 450 restores. Both relays 440 and 450 are now in their normal unoperated condition.

In response to the second pulse relay 400 again momentarily restores to complete circuits for both windings of relay 450 and only the lower winding of relay 440 as follows: ground contacts 402, 413, through contacts 452, and the upper winding of relay 450 and through contacts 447 through both lower windings of relays 440 and 450. Relay 450, being differential, will not operate over this circuit but relay 440 operates to effectively disconnect the 600 cycle and substitute the 1500 cycle current for modulating the transmitted carrier. Relay 440 closes contacts 442 being opening contacts 447 to maintain ground at contacts 414 connected to the lower windings of relays 440 and 450. At the end of the second pulse relay 400 reoperates and disconnects ground at contacts 402 from the upper winding of relay 450. Relay 450 now operates since its upper winding is no longer opposing its lower winding, having both relays operated.

In response to the third pulse relay 400 momentarily restores. When contacts 402 close a second time the upper winding of relay 440 is energized by way of ground through contacts 402, 413, and 451. The two windings of relay 440 are then energized in opposition to each other and this relay restores. Relay 450 remains operated by means of ground furnished through contacts 402,413, 447 and the lower winding of relay 450 to battery. Both windings of relay 440 remain energized in opposition to each other from the same ground circuit through contacts 402.

When contacts 402 open at the end of the third pulse the circuit energizing the lower winding of relay 450 is broken and relay 450 restores.

Upon a subsequent closing of contacts 402 the above cycle is repeated. Thus, it may be seen that relay 440 is operated only on alternate pulses of relay 400 to control modulation of the carrier.

Upon the first pulse relay 460 became energized through the following circuit. Ground, contacts 402, contacts 413, contacts 433, relay 460, and battery to ground, the pulse being of sufficient duration to operate slow-to-operate relay 460.

Relay 460 then operated relay 470 through the following circuit: ground, contacts 461, relay 470, and battery. Relay 470 then locked through its contacts 473 and remained locked as long as relays 410 and 430 remain operated.

Relay 460 releases between digits. Upon its release the charged condensers 409 and 466 are connected to the grid of tube 419 through the contacts 463. However, there is a 4-second delay before the tube 419 can fire and if the delay between digits is less than four seconds the tube will not fire. At the conclusion of the fifth, or last dialled digit there is a delay exceeding 4-seconds whereby the charges on capacitors 409 and 466 are dissipated to cause the tube 419 to fire. Relay 420 again operates and places a pulse on the relay 440—450 combination to alter the modulation. It is during the 4-second delay period that the called mobile subscriber is signalled.

When relay 420 operates after the 4-second delay it completes the following circuit for the operation of relay 190: ground, contact 421, contacts 472, contacts 465, conductor 468, contacts 153, relay 190, and battery to ground.

Relay 190 locks itself through its contacts 192 and opens the circuit to relay 400 at its contacts 191. Relay 400, upon restoring, at contacts 402 connects ground to the 440—450 relay combination before ground at contacts 422 is disconnected therefrom by the subsequent restoration of relay 420. After relay 400 restores and before relay 410 restores slow-to-operate relay 460 operates and at contacts 464 opens the circuit to relay 420. The restoration of relay 420 at this time is without effect because by this time relay 400 has restored and substituted ground at contact 402 for the ground at 422. After an interval relay 410 releases to restore the relays shown in the oscillator circuit. Relay 410 opens its contacts 418 to release relay 340 which at contacts 342 and 344 disconnect the oscillator 380 (Fig. 3) from the transmitter 503 and at contacts 341 and 343 connects the transmitter to the talking circuit extending to the telephone exchange. The talking circuit is marked in heavy conductors and includes an attenuator pad formed by resistors 270, 271*a* and 271*b* as well as an electronic voice signal amplifier which may be of any well known type.

The oscillators 445 and 446 are alternately placed in the transmitting circuit by operation of contacts 441 and 444 of relay 440. Oscillator 446 delivers a frequency signal of 600 cycles per second and 445 a frequency signal of 1500 cycles per second. The frequencies used were chosen for the sake of convenience; a wide variety of frequencies would give equally satisfactory results.

The oscillator circuits are constantly operating and are of the known phase-shift type and will not be described in great detail. When relay 440 is operated a circuit is completed through contacts 441 which takes oscillation 446 out of the transmitting circuit and enables oscillator 445 to send a 1500 cycle per second tone over the transmitter. When relay 440 restores the oscillators are transposed in the transmitter circuit.

The oscillator circuits are identical except for the values of the resistors and capacitances which are fixed to give 1500 cycles per second frequency from oscillator 445 and 600 cycles per second frequency from oscillator 446. A conductor 467 provides 130 volt current for both circuits. Each oscillator circuit includes an inductance 480*f* and 480*s* which are identical. The tubes 445*t* and 446*t* are also identical. The resistors 483*f* and 483*s* are made variable so that the fundamental frequency of each circuit may be varied a small amount to compensate for tolerances in resistor and condenser values. The gain may be adjusted by resistors 481*f* and 481*s*.

Typical values of the resistors and condensers of the oscillator circuits of Fig. 4 which will give the desired frequencies are shown below:

| Condenser No. | Value | Resistor No. | Value |
|---|---|---|---|
| | *mf.* | | *Ohms* |
| 478*f* | 0.0001 | 475*f* | 270,000 |
| 484*f* | 0.001 | 476*f* | 390,000 |
| 485*f* | 10 | 479*f* | 10,000 |
| | | 481*f* | 250,000 |
| 478*s* | 0.00025 | 482*f* | 56,000 |
| 484*s* | 0.001 | 483*f* | 250,000 |
| 485*s* | 10 | 486*f* | 1,500 |
| | | 487*f* | 1.0 |
| | | 488*f* | 390,000 |
| | | 475*s* | 330,000 |
| | | 476*s* | 470,000 |
| | | 479*s* | 10,000 |
| | | 481*s* | 250,000 |
| | | 482*s* | 56,000 |
| | | 483*s* | 250,000 |
| | | 486*s* | 1,800 |
| | | 487*s* | 1.0 |
| | | 488*s* | 390,000 |

Both of oscillators 445 and 446 are fed into a standard amplifier stage to raise the gain and also to provide isolation from the oscillators to the line. An amplifier tube 490 draws plate current from conductor 467. The amplifier circuit operates satisfactorily with resistors and condensers of the value indicated below:

| | |
|---|---|
| Condenser No. **492**__________________mf__ | 10.0 |
| Resistor No. **491**___________________ohms__ | 700 |
| Resistor No. **493**____________________do____ | 10,000 |
| Resistor No. **494**____________________do____ | 560 |
| Resistor No. **495**____________________do____ | 120 |

The amplifying stage of tube 490 is coupled to the outgoing conductors 447 and 448 by means of transformer 496. The gain may be adjusted by the attenuator pad formed by resistors 494, 495*a*, and 495*b*.

Filament current for tubes 419, 445*t*, 446*t*, and 490 may be from a common source (not shown). Either alternating or direct current may be used for heating the filaments.

The oscillator system feeds the transmitter 503 by way of conductors 447—119*a*—113*t* and 448—112*a*—112*t*. The oscillator output runs well over 0 db at its peak and is more than sufficient to feed the transmitter 503.

Signal lights are operated responsive to energization of some of the relays in order to inform the terminal control panel technicians of the condition of the system. The operation of relay 170 closes a circuit at its contacts 173 for the operation of the carrier on-air lamp 177. Relay 160 completes a circuit at its contacts 162 for the operation of the busy lamp 169.

If the radio transmitter 503 fails to go on the air when the operator plugs in, or if it operates on the wrong frequency, an alarm circuit will respond after a delay of 20 seconds. When relay 160 is energized it closes its contacts 163 to complete the following grid circuit to control the firing of an electron tube 300: ground, condenser 301, contacts 163, contacts 177, resistor 302, and grid of tube 300. Resistor 302 is of the order of 5 megohms in order to give about a 20-second delay before the tube 300 fires.

When the tube 300 fires the following circuit is completed for the operation of an alarm relay 310: ground, resistor 304, cathode and anode of tube 300, relay 310, and battery to ground.

If relay 310 is energized it completes the following circuit for operation of a failure lamp 305: ground, contacts 311, contacts 174, lamp 305, and battery to ground. Operation of relay 310 also completes the following bell alarm circuit: ground, contacts 312, contacts 176, alarm bell 306, and battery to ground. It will be noted that both of these circuits are broken by the energization of relay 170 at its contacts 174 and 176 so that the tube may fire and operate relay 310 as soon as relay 170 operates and removes the bias from tube 300 at contacts 177. When tube 300 fires and relay 310 operates, after operation of relay 170, the operation of relay 310 is without effect since relay 170 at contacts 174 and 176 has opened the circuits to the failure lamp 305 and the alarm buzzer 306. If the transmitter 159 fails to go on the air relay 170 will be energized and the tube, failure lamp, and alarm circuits will be completed. The 20-second delay is sufficient to prevent an alarm during any momentary line failure or any condition which would last for only a few seconds. The filament of the tube 300 may be in the circuit with the filaments of the oscillator circuit tubes.

*The mobile equipment*

The mobile receivers were described in detail in my previously mentioned application which described the manner in which one of a plurality of mobile receivers could be alerted for a conversation.

The mobile transmitters were also described in my previous application and will be referred to here only as necessary to explain the operation of the stationary equipment. When the mobile subscriber answers the call his transmitter is automatically prepared for operation. Since conversation can be carried on in only one direction at a time the mobile subscriber must manipulate a switch to cut out his receiver and cut in his transmitter when he wishes to speak. The mobile transmitters are of low power and therefore a number of stationary receivers are distributed at various separated geographical points in order to give distinct reception over a wide area.

*The stationary receivers*

Briefly the signals from the mobile transmitters are picked up by the stationary land receivers such as are indicated by numerals 504$a$, 504$b$ and 504$c$ in Fig. 5. These receivers are of the type usually used in short-wave reception. The control circuit of each receiver as represented by numerals 320 and 321 of Fig. 3 may have a pad (not shown) to permit incoming gain adjustment directly at the terminal. The several receivers are coupled to the conductors 112$r$ and 113$r$ which run to the switchboard 102.

When the called mobile subscriber's transmitter is placed on the air one of the stationary receivers such as 504$a$ or 504$b$ picks up the transmitted mobile carrier to operate a relay (not shown) which in turn grounds conductor 360 through the test jacks 250 to in turn operate relay 280. Relay 280 locks to ground at contacts 152 and at contacts 282 opens the locking circuit of relay 180. Relay 180 restores and at contacts 181 opens the previously traced circuit for operating relay 130. Relay 130 restores and at contacts 131 opens the circuit to lamp 128 thereby extinguishing lamp 128 to advise the operator that the mobile subscriber has answered the call. Incoming voice signals are transmitted over the heavy talking conductors, repeat coil 326, low pass filter 323—325, amplifier 201, pad 202—209, conductors 112$r$—113$r$ to the junction with the outgoing heavy talking conductors, through repeat coil 145, over conductors to the telephone exchange, repeat coil 133, jack 103 and connected plug and over the established connection to the calling land subscriber's telephone.

After conversation and in response to the land subscriber replacing his receiver the operator is given the usual disconnect signal in the well-known manner and in response thereto the operator withdraws the plug from jack 103. Relays 110 and 120 restore in response to the withdrawal of the plug from jack 103. At contacts 121 relay 120 opens a circuit to extinguish lamp 129 and at 122 opens the circuit to the sleeve of jack 103 to remove the busy ground therefrom. At contacts 111 relay 110 disconnects ground from relay 140 which accordingly restores. At contacts 143 relay 140 extinguishes the line lamp and at contacts 141 opens the circuit to the slow-to-release relay 150 which restores after a predetermined interval. At contacts 152 relay 150 opens the locking circuit of relay 280 which restores, at contacts 153 opens the locking circuit of relay 190 which also restores, and at contacts 151 opens the circuit to relay 160. Relay 160 restores and at contacts 162 extinguishes busy lamp 169. At contacts 161 relay 160 disconnects battery through resistance 308 from transmitter 503 to cause the transmitter to remove its carrier from the air, at back contacts 163 recompletes, the circuit for charging condenser 301, and at contacts 164 removes the 130 volt source to restore relay 310 and tube 300. When the transmitter carrier is removed from the air relay 170 restores. All of the apparatus in the control station and telephone exchange are in normal position ready for use on subsequent calls.

*Incoming call*

When a receiver such as 504$a$ or 504$b$ is signaled by a mobile subscriber who is initiating a call a circuit is completed for signalling the operator of an incoming call.

The incoming voice signal is passed through a low pass filter 323 to remove noise and through a voice amplifier 201 to increase its gain. The voice signal is then passed through another pad such as is provided by the series of resistors 202 to 209, inclusive.

The voice amplifier 201 consists of an electron tube amplifying means similar to the voice amplifier 200 of the type commonly known in the art.

From the second pad the incoming voice signal passes through conductors 112$r$ and 113$r$ to join the transmitter conductors 112 and 113. The circuit is then completed to the switchboard by the same path used by the transmitter circuit.

Throughout Figures 1, 2, and 3 a number of plug-in jacks 250 are shown. These are all for the convenience of the technicians at the control panel who may wish to by-pass any portion of the equipment which is not functioning properly. More in detail, when a mobile subscriber initiates a call reception of its carrier will energize a relay (not shown) in the stationary receivers. When energized this relay closes a contact which furnishes ground via a conductor 360 which energizes relays 220 and 280. Relay 220 closes at its contacts 222 to supply ground through contacts 175 and by way of conductor 113$s$ to operate relay 130. At contacts 223 relay 220 completes a locking circuit for itself. Relay 130 completes a circuit at its contacts 132 for signal lamp 127 which informs the operator that a call is coming in. When the operator plugs in the answer cord, the stationary or land transmitter 503 goes on the air, the circuit for the lamp 127 is broken at contacts 121 by operation of relay 120 and the contacts 121 switch on the red busy lamp 129. Relay 110 is operated when the plug is inoserted in jack 103 and at contacts 111 relay 110 completes the circuit for operating relay 140.

Relay 140 is energized when the operator inserts the plug and this relay energizes relay 150 through contacts 141. Relay 150 operates its "X" contact 153. Ground is thereupon furnished through the contacts 221 and 153 for the operation of relay 190. Relay 190 thereupon opens the oscillator circuit at its contacts 191 and completes a locking circuit for itself at contacts 192. At contacts 152 relay 150 completes an obvious locking circuit for relay 280 and at contacts 154 opens the locking circuit of relay 220 which restores to open the circuit of relay 130 at contacts 222. Relay 130 restores to open the circuit to lamp 128.

The operation of relay 150 at contacts 151 also completes the circuit for operating relay 160 which starts the transmitter 503 as previously described by connecting negative battery through resistance 308 over conductor 112$t$ to transmitter 503. Relay 160 at contacts 162 again lights the busy lamp 169, at contacts 163 again connects the charged condenser 301 to negatively bias tube 300, and at contacts 164 again connects the 130 volt source to relay 310 and the plate of tube 300. Relay 170 operates in the manner previously described when the carrier of transmitter 503 is placed on the air to again light the lamp 178 and open the circuits to failure lamp 305 and alarm 306. The tube 300 fires and relay 310 operates without effect as previously described because relay 170 has operated. In case the carrier is not placed on the air, or is of an incorrect frequency, relay 170 fails to operate with the result that the negative bias from charged condenser 301 is effective to delay the firing of tube 300 and the operation of relay 310 for a period of twenty seconds as previously described. In this case when relay 310 does operate, with relay 170 in restored position, the failure lamp 305 and alarm 306 are operated to advise the attendant of such failure.

After plugging in the operator may talk to the calling mobile subscriber over the previously described talking circuits and upon receiving the call number of the desired land subscriber, or another mobile subscriber the operator will establish connection therewith in the well-known manner. After conversation the operator is given the usual disconnect supervisory signal and thereupon removes the plug from jack 103. Relays 110 and 120 restore as previously described to release relay 140. Relay 140 restores relay 150 150 which at contacts 152 opens the locking circuit of relay 280. At contacts 153 relay 150 opens the locking circuit of relay 190 and at contacts 151 opens the circuit of relay 160. Relays 280, 190 and 160 restore. Relay 160 at contacts 161 causes the transmitter 503 to remove the carrier from the air, and extinguishes lamp 169 and releases relay 310 as previously described. The removal of carrier from the air restores relay 170 to normal with the result that all apparatus is now at normal.

In Figures 1, 2 and 3, numerals 133, 145, 326, and 327 designate coupling transformers which may be of the conventional design.

The values of resistors and capacitors used in the oscillator and oscillator amplifier circuits have been given previously. Satisfactory values for the remaining resistors and capacitors are given below opposite the number assigned to the particular part on the drawings. The apparatus could function satisfactorily with resistors and capacitors varying considerably from those listed but the values shown function effectively in the desired manner.

| Capacitor No. | Value | Resistor No. | Value |
|---|---|---|---|
| | *Mfd.* | | |
| 301 | 4.0 | 121 ohms | 1,000 |
| 325 | 0.151 | 202 do | 400 |
| 404 | 2.0 | 203 do | 400 |
| 406 | 1.0 | 204 do | 1,200 |
| 409 | 2.0 | 205 do | 50 |
| 418 | 2.0 | 206 do | 50 |
| 466 | 2.0 | 207 do | 2,000 |
| | | 208 do | 50 |
| | | 209 do | 50 |
| | | 270 do | 1,200 |
| | | 271*a* do | 400 |
| | | 271*b* do | 400 |
| | | 302 megohms | 5.0 |
| | | 303 do | 2.0 |
| | | 304 ohms | 1,500 |
| | | 307 do | 50 |
| | | 308 do | 200 |
| | | 324 do | 50 |
| | | 403 do | 200 |
| | | 405 do | 600 |
| | | 407 do | 50 |
| | | 408 do | 50 |
| | | 415 megohms | 0.33 |
| | | 416 do | 4.7 |
| | | 417 ohms | 1,500 |
| | | 424 do | 270,000 |
| | | 426 do | 1,000 |
| | | 445 do | 115 |
| | | 446 do | 115 |

While the above description sets forth a specific embodiment of the invention it is understood that this is not intended as a limitation in scope other than as necessitated by the appended claims.

I claim as my invention:

1. In a radio telephone system, a transmitter control circuit comprising a trunk relay which may be energized by a manual control, a first control circuit relay energizable by contacts of said trunk relay, a second control circuit relay energizable by contacts of said first control circuit relay, said second control circuit relay being of the slow-release type, a third control circuit relay energizable by contacts on said second control circuit relay, a transmitter, a circuit for the operation of said transmitter which is completed by the closing of a contact of said third control circuit relay, a fourth control circuit relay energizable by completion of the circuit of said transmitter, means for sending a series of electrical impulses in rapid succession through said trunk relay and said first control circuit relay, a first oscillator circuit relay energizable by contacts of said first control circuit relay, a second oscillator circuit relay energizable by contacts of said first oscillator circuit relay, said second oscillator circuit relay being of the slow-release type, a condenser with a discharge circuit which is closed by contacts of said second oscillator circuit relay, an electron tube which is controlled by the discharge of said condenser, a third oscillator circuit relay disposed to be energized by plate currents from said electron tube, a fourth oscillator circuit relay energizable by contacts of said third oscillator circuit relay, said fourth oscillator circuit relay having contacts which break the energizing circuit of said third oscillator circuit relay, a fifth oscillator circuit relay energizable by contacts on said third oscillator circuit relay and also energizable by contacts on said first and second oscillator circuit relays acting in cooperation, a sixth oscillator circuit relay, said fifth and sixth oscillator circuit relays being of the differential type, a circuit interconnecting the energizing coils of said fifth and sixth oscillator circuit relays whereby the said relays are operated on alternate current impulses, two oscillators of different frequencies actuated by contacts of one of said fifth and sixth oscillator circuit relays whereby one of said oscillators is connected to said transmitting circuit on even impulses and the other of said oscillators is connected to said transmitting circuit on odd impulses, and means for eliminating the oscillator circuit from the said transmitting circuit.

2. In a radio telephone system, a switchboard, manually operated circuit closing means associated with said switchboard, signal means associated with said switchboard for indicating busy lines, incoming calls, and completion of dial tone circuits, a control panel for supervising operation of said system, a transmitter circuit which may be completed through said manually operated circuit closing means, an oscillator circuit which may be connected to said transmitter circuit, a series of control relays in the circuit of said transmitter, said control relays other than the first being energized successively each responsive to closing of contacts on the preceding relay, said control relays comprising a first relay energized by completion of a manual control circuit, a second relay which connects said oscillator circuit, a third relay which is slow to release, a fourth relay which completes a circuit to said transmitter and also operates a control panel busy signal, a fifth relay which operates a control panel on-air signal and completes a circuit back to the said switchboard, and a sixth relay which makes and breaks the contacts which include said oscillator circuit in said transmitter circuit, a series of oscillator control relays for said oscillator circuit, said oscillator control relays comprising a seventh relay responsive to said second relay and capable of being pulsed by pulses transmitted by said first relay, an eighth relay of the slow-release type which controls a condenser discharge timing circuit through an electron tube, a ninth relay energized by the firing of said electron tube, a tenth relay energized by said ninth relay which breaks the energizing circuit of said ninth relay, an eleventh relay which responds to the energization of said ninth relay to switch one of two oscillators into said transmitter circuit, said eleventh relay being also responsive to said seventh and eighth relays operating in cooperation with each other, and a twelfth relay interconnected with said eleventh relay by a circuit whereby the said eleventh and twelfth relays close contacts alternately when energized by a series of impulses.

3. In a radio telephone system, a transmitter, means for sending frequency code signals over said transmitter whereby one of a plurality of receivers tuned to said transmitter may be alerted, said means including a pulsing relay, a slow-release relay energizable by contacts of said pulsing relay, said slow-release relay remaining energized during a series of digital pulses passing through said pulsing relay, a timing condenser with a discharge circuit completed by contacts of said slow-release relay, an electron tube controlled by discharge of said condenser, an electron tube circuit relay energizable by firing of said tube, a fourth relay energizable by contacts of said electron tube relay, said fourth relay having contacts which break the energizing circuit of said electron tube relay, a pair of differential relays interconnected to close contacts upon alternate pulses of said pulsing relay, said differential relays being energizable by operation of said fourth relay and also by said pulsing and slow-release relays acting in cooperation with each other, and a pair of oscillator circuits tuned to different frequencies, said oscillator circuits being alternately connected to said transmitter by operation of the contacts on one of said differential relays.

4. A radio telephone system as claimed in claim 3 in which one of the differential relays has a make-before-break contact which furnishes ground on both the make and break contacts to energize one of the windings of both differential relays and the other of said differential relays has a contact which furnishes ground to energize in opposition to the other of its own windings, the said contact of said other relay furnishing ground to energize in opposition the other winding of said one relay upon the operation of the said contact of said other relay, the ground for both of said relays coming from the same source when said relays are in unoperated and unenergized condition.

5. In a radio telephone system, a transmitter control circuit comprising a trunk relay energizable by a manual control, a first control circuit relay energizable by contacts of said trunk relay, a second control circuit relay energizable by contacts of said first control relay, said second control circuit relay being of a slow-release type, a third control circuit relay energizable by contacts on said second control circuit relay, a transmitter, a circuit for the operation of said transmitter which is completed by the closing of a contact of said third control circuit relay, a fourth control circuit relay energizable by the completion of the circuit of said transmitter, means for sending a series of electrical impulses in rapid succession through said trunk relay and said first control circuit relay, an oscillator circuit including two oscillators set at different frequencies, relays means in said oscillator circuit for alternately switching the said two oscillators into and out of the said oscillator circuit responsive to the pulsing of said first control circuit relay, additional relay means for including and excluding said oscillator circuit in and from the circuit of said transmitter, and a plurality of receivers connected to the conversation circuit of said transmitter.

6. In a radio telephone system adapted for two-way conversation between stationary-to-mobile, mobile-to-stationary, and mobile-to-mobile subscribers, a stationary transmitter and receiver apparatus comprising a switchboard, means for signaling said switchboard at the inception of a call, a trunk relay associated with said switchboard and energizable by a manual control on said switchboard, means for sending digit code pulses through said trunk relay, a control relay operated responsive to said trunk relay, a slow-release relay operated responsive to said first control relay, a transmitter control relay operated responsive to said slow release relay, said transmitter control relay being disposed to complete the circuit of said stationary transmitter, an incoming ground relay operated by completion of the transmitter circuit, an oscillator control relay operated by said incoming ground relay to include an oscillator circuit in the circuit of said transmitter, a selective signal oscillator circuit including two oscillators tuned to different frequencies and disposed to be included alternately in the circuit of said transmitter, a first differential relay with contacts for shifting circuits between said two oscillators, a second differential relay interconnected with said first differential relay and cooperating therewith to operate the contacts of said first differential relay on alternate pulses through said trunk relay, relay means responsive to said first control relay for energizing said two differential relays, additional relay means for eliminating the said oscillator circuit from said transmitter circuit, and a plurality of receiver means connected to said switchboard through the conversation circuit.

7. In a radio telephone system, a switchboard, a transmitter controlled from said switchboard, said control comprising a trunk relay energizable by a manual control and also by a pulsing means, a first control circuit relay energizable by contacts of said trunk relay, an oscillator circuit including two oscillators set at different frequencies, relay means for including and excluding said oscillator circuit in and from the circuit of said transmitter, additional relay means for shifting said oscillators alternately into the circuit of said transmitter responsive to pulses received from said first control relay, a slow-release second control circuit relay energizable by contacts of said first control circuit relay, a third control circuit relay energizable by contacts of said second control circuit relay, said third control circuit relay having contacts which complete an operating circuit for said transmitter, a fourth control circuit relay energizable by completion of the operating circuit of said transmitter, said fourth control circuit relay having contacts which complete a circuit between said switchboard and said transmitter, an alarm relay energizable by an electron tube timing circuit, the said timing circuit being controlled by contacts of said third control circuit relay, and an alarm circuit controlled by contacts of said alarm relay, said alarm circuit being broken by contacts of said fourth control circuit relay upon the energization thereof.

8. In a radio telephone system, a control station, a transmitting circuit completed in said station in response to the seizure of said station for transmitting a carrier modulated by a given frequency, a thermionic tube, a relay connected to the anode of said tube, an operating circuit including said tube completed in response to the seizure of said control station for operating said relay, a biasing circuit also completed responsive to the seizure of said control station for biasing said tube for a first predetermined time interval to delay the operation of said relay over said operating circuit for said first predetermined time interval, means responsive to the operation of said relay for altering said transmitter circuit to modulate said carrier with a different frequency, means in said control station responsive to the receipt of dial pulses for altering said transmitting circuit to alternately modulate said carrier with said given and different frequencies, an additional biasing circuit for biasing said tube for a second predetermined time interval to delay the operation of said relay at the conclusion of the dial pulses for said second predetermined time interval, and a by-pass circuit for said operating circuit responsive to the operation of said relay at the conclusion of said dial pulses.

ROBERT P. DIMMER.

REFERENCES CITED

The following references are of record in the file of this patent:

UNITED STATES PATENTS

| Number | Name | Date |
|---|---|---|
| 2,064,958 | Taylor | Dec. 22, 1936 |
| 2,265,056 | Bowers | Dec. 2, 1941 |
| 2,457,434 | Bartelink | Dec. 28, 1948 |
| 2,475,675 | Peterson | July 12, 1949 |